(12) United States Patent
Kubota

(10) Patent No.: US 7,646,496 B2
(45) Date of Patent: Jan. 12, 2010

(54) PRINT SYSTEM, PRINTER HOST, PRINT SUPPORT PROGRAM AND PRINT METHOD

(75) Inventor: Eiji Kubota, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 894 days.

(21) Appl. No.: 10/959,908

(22) Filed: Oct. 5, 2004

(65) Prior Publication Data

US 2005/0200861 A1    Sep. 15, 2005

(30) Foreign Application Priority Data

Oct. 6, 2003    (JP)    ............................. 2003-346965

(51) Int. Cl.
*G06F 15/00*    (2006.01)
(52) U.S. Cl. ..................... 358/1.1; 358/1.12; 358/1.18
(58) Field of Classification Search ................. 358/1.4, 358/1.8, 1.5, 1.6, 1.18, 1.2, 1.1; 347/5, 16, 347/37
See application file for complete search history.

(56) References Cited

U.S. PATENT DOCUMENTS

| | | | | |
|---|---|---|---|---|
| 2,358,114 | A * | 9/1944 | Stafford et al. .............. | 101/228 |
| 5,119,079 | A * | 6/1992 | Hube et al. ................. | 715/823 |
| 6,229,591 | B1 * | 5/2001 | Motooka et al. .............. | 355/27 |
| 6,887,003 | B2 * | 5/2005 | Someno ....................... | 400/621 |
| 7,215,439 | B2 | 5/2007 | Suzuki | |
| 7,277,192 | B2 | 10/2007 | Kotani et al. | |
| 7,328,969 | B2 * | 2/2008 | Kubota ....................... | 347/37 |
| 2004/0207875 | A1 * | 10/2004 | Endo ......................... | 358/1.18 |
| 2005/0225779 | A1 * | 10/2005 | Kubota ....................... | 358/1.2 |

(Continued)

FOREIGN PATENT DOCUMENTS

JP    2001-134558    2/2001

(Continued)

OTHER PUBLICATIONS

Abstract of Japanese Patent Publication No. 2003-114771, Pub. Date: Apr. 18, 2003, Patent Abstracts of Japan.

(Continued)

*Primary Examiner*—Kimberly A Williams
(74) *Attorney, Agent, or Firm*—Martine Penilla & Gencarella, LLP

(57) ABSTRACT

When a continuous borderless printing is carried out, in order to reduce a difference between an image region displayed on a screen and an image region as a print result, a print system according to the present invention is directed to a system which carries out the continuous borderless printing by printing an image having a wider width than a width of the continuous-form paper, comprising, a print area setting means which sets a print area having a wider width than the width of the continuous-form paper, an image display means which displays an area corresponding to the width of the continuous-form paper out of said print area having been set by the print area setting means, an image read means which reads an image as to the print area having been set by the print area setting means, an image edit means which edits the image as to the area being displayed, a print data generation means which generates print data on the basis of the image as to the print area having been set by the print area setting means, and a print execution means which executes printing on the basis of the print data.

6 Claims, 4 Drawing Sheets

FOREIGN PATENT DOCUMENTS

| | | |
|---|---|---|
| JP | 2003-114771 | 4/2003 |
| JP | 2003-162389 | 6/2003 |
| JP | 2003-231323 | 8/2003 |

OTHER PUBLICATIONS

Abstract of Japanese Patent Publication No. 2003-162389, Pub. Date: Jun. 6, 2003, Patent Abstracts of Japan.

Abstract of Japanese Patent Publication No. 2001-134558, Pub. Date: May 18, 2001, Patent Abstracts of Japan.

Abstract of Japanese Patent Publication No. 2003-231323, Pub. Date: Aug. 19, 2003, Patent Abstracts of Japan.

* cited by examiner

FIG. 3A
FIG. 3B
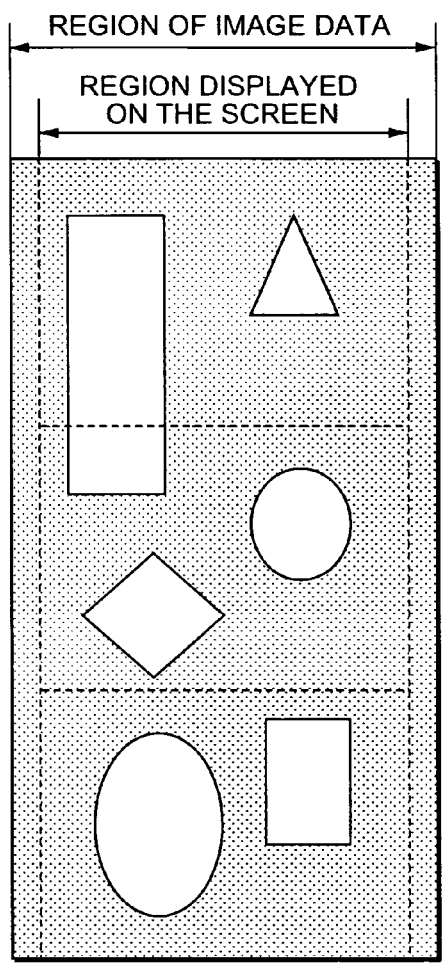
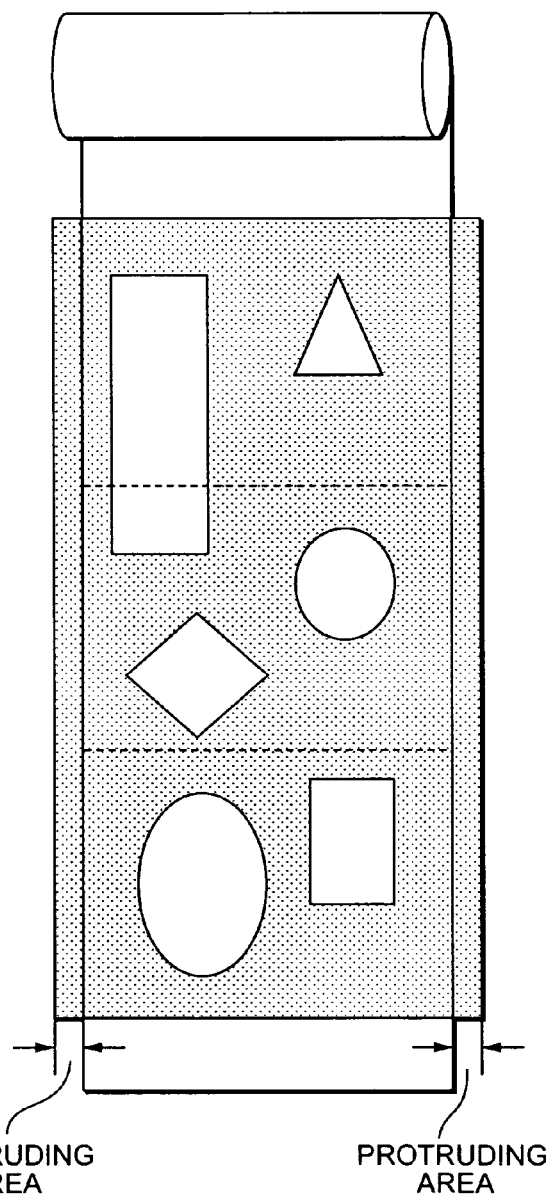

RELATED ART
FIG. 4A
FIG. 4B
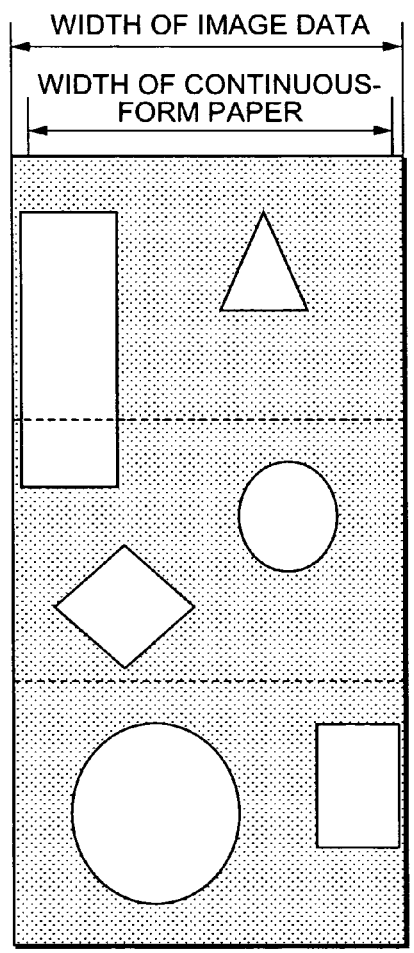
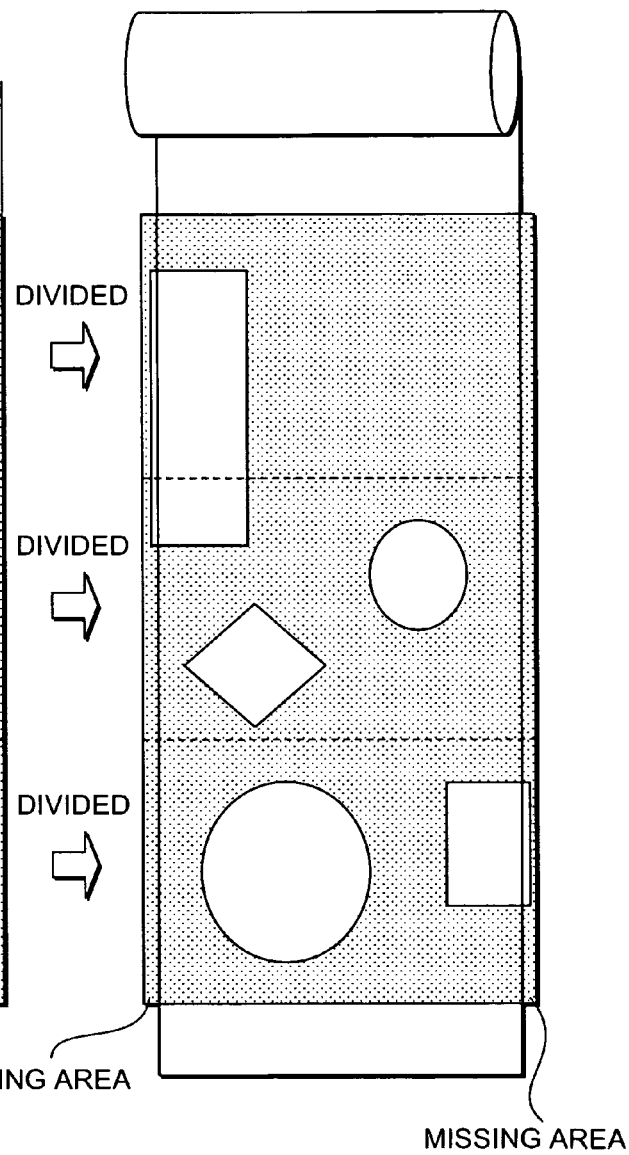

PRINT SYSTEM, PRINTER HOST, PRINT SUPPORT PROGRAM AND PRINT METHOD

BACKGROUND OF THE INVENTION

The present invention relates to a print system, and more particularly, it relates to a print system which carries out borderless printing for so-called continuous printing which prints a continuous image on long continuous-form paper.

A print system, which is capable of printing on continuous-form paper as a print medium, has become widespread, the continuous-form paper being a roll paper and the like. The print system as described above has a function not only to print on the continuous-form paper an image of normal sizes, such as A4, B5, and regular print size, but also to carry out continuous printing to print a continuous image, such as panoramic photo and a banner, utilizing a property of the continuous-form paper.

In the meantime, when an image or the like captured by a digital camera or the like is printed by a printer, an area (a margin) having no print has been generated on each side portion of the print sheet. In recent years, a technological development has been promoted so as to achieve a printing on the overall surface of the print sheet by eliminating the margin, so called borderless printing, and such a technology has been commercialized. This borderless printing is carried out also for the continuous printing (hereinafter, referred to as "continuous borderless printing"), and it is implemented by the following processing.

As shown in FIG. 4A, an image area which is wider than a width of continuous-form paper by a few millimeters is set up, and a user generates and/or edits image data to be printed by use of the edit display of a printer host. Subsequently, the printer prints the image which is wider than the width of the continuous-form paper in such a manner as protruding from both side regions of the paper, whereby the continuous borderless printing can be carried out.

It is to be noted that the image data used for the continuous printing requires enormous memory area if it is processed at a time. Therefore, in some cases, the image data is divided into several regions (regions divided by broken lines in the figure), and print processing is carried out with respect to each region.

SUMMARY OF THE INVENTION

When the continuous borderless printing is carried out by setting an image region wider than the width of the continuous-form paper, as shown in FIG. 4B, a portion protruding from the width of the continuous-form paper is not printed on the paper. Therefore, a print result is such that the left and right portions of the original image are missing. Therefore, the image region which the user displays on the edit display and the image region as a print result become different.

An object of the present invention is to reduce a difference between the image region displayed on the screen and the image region as a print result, when the continuous borderless printing is carried out.

In order to solve the above problem, a print system according to the present invention is directed to a print system which carries out a continuous borderless printing by printing an image having a width wider than a width of continuous-form paper, comprises, a print area setting means which sets a print area having a width wider than the width of the continuous-form paper, an image display means which displays a region corresponding to the width of the continuous-form paper, out of the print area set by the print area setting means, an image read means which reads an image as to the print area set by the print area setting means, an image edit means which edits the image as to the region which is displayed by the image display means, a print data generation means which generates print data on the basis of the image in the print area set in the print area setting means, and the print execution means which executes printing on the basis of the print data.

In the present invention, the print area is set to have a width wider than the width of the continuous-form paper, thereby achieving a borderless printing. Furthermore, a region corresponding to the width of the continuous-form paper is displayed on the screen at the time of image editing, whereby the image region displayed on the screen and the image region as a print result agree with each other.

BRIEF DESCRIPTION OF THE DRAWINGS

FIG. 3 shows illustrations to explain a processing of the continuous borderless printing according to the present invention.

FIG. 3A is an edit display.

FIG. 3B is a print result.

FIG. 4 shows illustrations to explain a processing of a conventional continuous borderless printing.

FIG. 4A is enlarged image data.

FIG. 4B is a print result.

DETAILED DESCRIPTION OF THE PREFERRED EMBODIMENTS

Preferred embodiments of the present invention will be explained with reference to the accompanying drawings.

Figure 1:
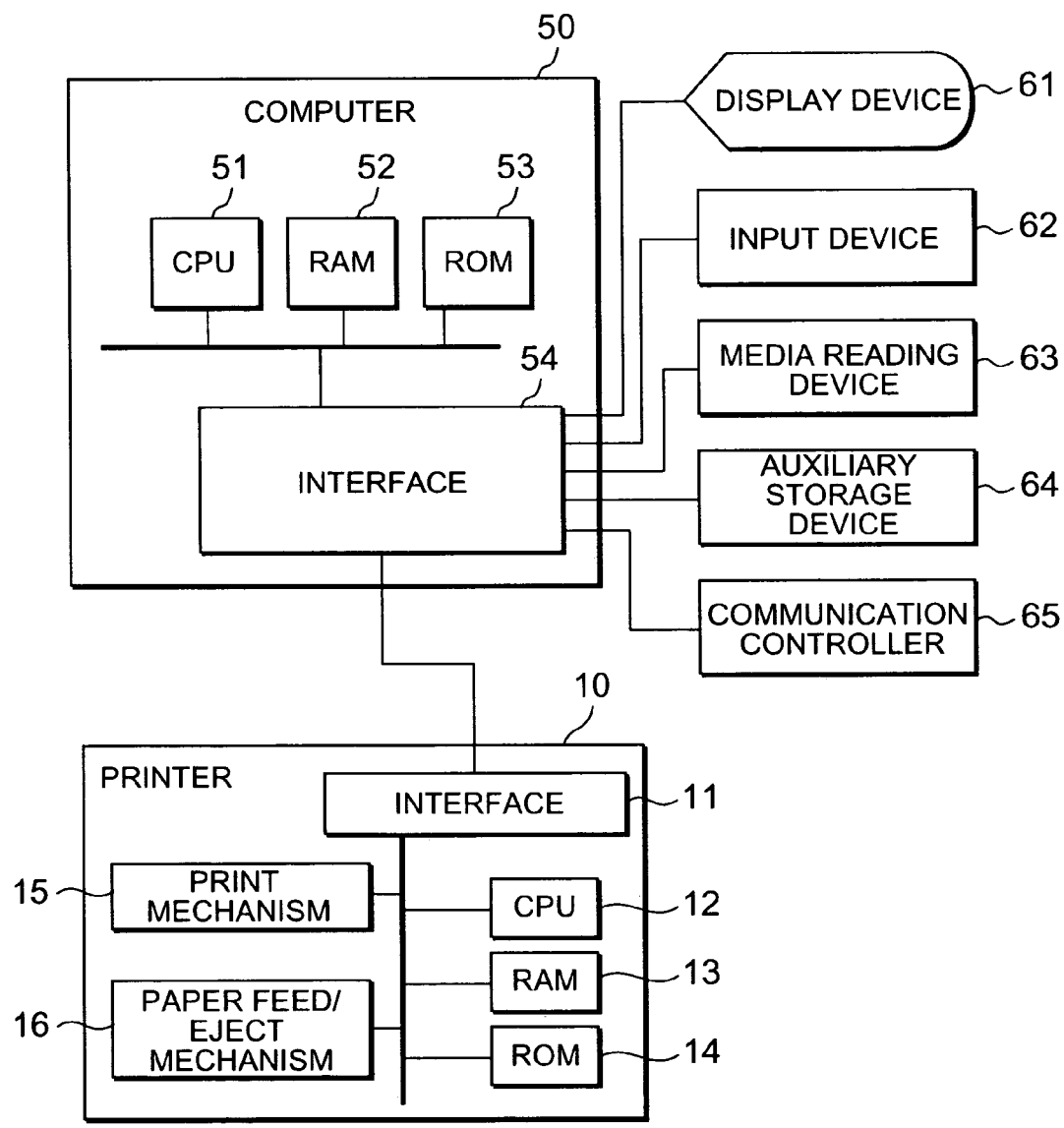
FIG. 1 is a block diagram to schematically explain a hardware configuration of the print system.

FIG. 1 is a block diagram to explain the hardware configuration of the print system to which the present invention has been applied.

As shown in FIG. 1, the print system comprises a computer 50 to implement various processing according to applications, print processing and the like by a printer driver, and a printer 10 which is connected to the computer 50. In the present embodiment, the computer 50 functions as a printer host which generates print data and transmits the print data to the printer 10. On the other hand, the printer 10 is a print device which carries out printing on the basis of the print data transmitted from the computer 50. The printer 10 has a roll-paper feed mechanism, and is provided with a so-called continuous borderless printing function, which carries out printing continuous image on roll paper without generating margins on left and right sides thereof.

The computer 50 comprises a CPU (Central Processing Unit) 51 which executes processing based on various programs, RAM (Random Access Memory) 52 which temporarily stores data, programs and the like, ROM (Read Only Memory) 53 which previously stores in nonvolatile manner, various data to control the computer 50, start-up programs and the like, and interface 54 which is responsible for data transmitting/receiving with peripheral equipment such as the printer 10 being connected.

In addition, the computer 50 is connected to a display device 61 such as a color display, an input device 62 such as a mouse and a keyboard, a media reading device 63 to read data from a recording medium such as CD-ROM, a built-in or external auxiliary memory 64, and a communication controller 65 to establish connection with the computer network such as the Internet.

The printer 10 is an ink-jet color printer, for example. The ink-jet color printer is provided with a plurality of ink cartridges each having a housing filled with ink, and printing is carried out by spraying the ink from a print head to a print medium, such as print sheet, roll paper and the like.

The printer 10 comprises an interface 11 which is responsible for a communication with the computer 50 such as data receiving therefrom, a CPU 12 which carries out processing on the basis of the print data, various programs and the like, RAM 13 which temporarily stores the print data and the like, ROM 14 which stores in advance various data, various programs and the like in nonvolatile manner to control the printer 10, a print mechanism 15 including a print head which sprays ink, a carriage drive mechanism or the like which drives a carriage on which the print head is mounted, and a paper feed/eject mechanism 16 which carries out feeding and ejecting print sheet and the like.

Next, with reference to the functional block diagram of FIG. 2, functional configurations in the computer 50 and the printer 10 will be explained, which are implemented by the print system as described above.

Figure 2:
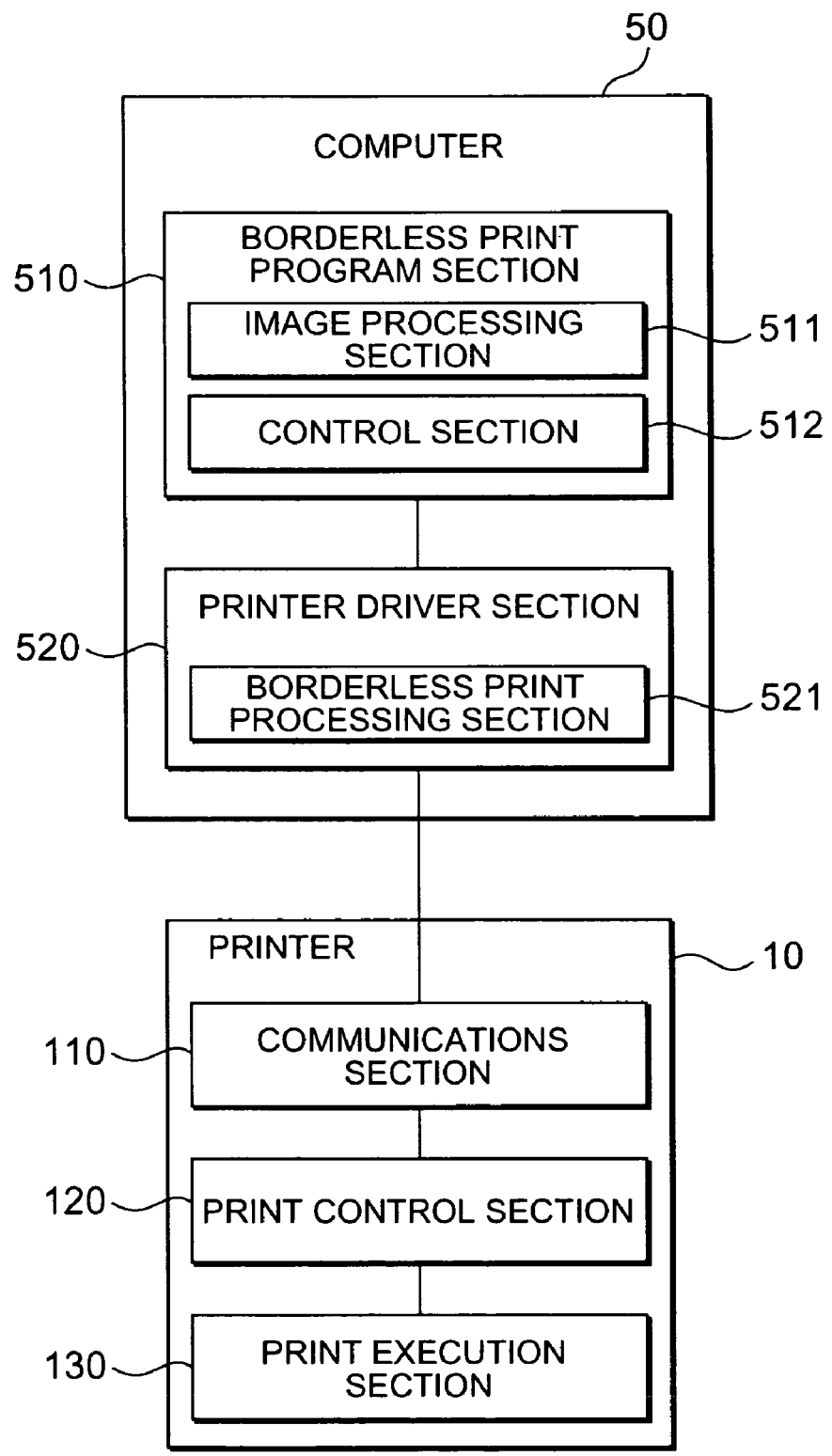
FIG. 2 is a block diagram which shows a functional configuration of the print system.

As shown in FIG. 2, a borderless print program section 510 and a printer driver section 520 are established on the computer 50.

When the borderless printing is carried out by the print system according to the present invention, the borderless print program section 510 generates an image to be printed based on an operation from a user, and gives a direction to carry out the borderless printing to the printer driver section 520.

Therefore, the borderless print program section 510 is provided with an image processing section 511 having image generation and editing functions, and a control section 512 which performs a control of each processing, such as borderless print processing, in the borderless print program section 510.

The CPU 51 executes a borderless print application program, which has been loaded on the RAM 52, thereby establishing the borderless print program section 510 on the computer 50.

The printer driver section 520 has a function to notify the borderless print program section 510 of the print area in the printer 10, and a function to input image data generated by the borderless print program section 510 according to the print area thus notified, to convert the image data into print data in a format which can be interpreted by the printer 10, and to transmit the print data to the printer 10 via the interface 54. In the conversion process to the print data, specifically, the following processing is carried out, i.e.: rasterizing processing which expands the read image data to image data as an aggregation of dots, half-tone processing which performs color conversion processing and half-toning processing as to the image data, and a processing for converting thus processed image data into print data.

The printer driver section 520 is provided with a borderless print processing section 521, and when the borderless printing is carried out using roll paper as a print medium, the printer driver section 520 sets as a print area, a region somewhat wider than the width of the roll paper, and notifies the borderless print program section 510 of the print area. For example, both sides of the print area are respectively wider than the width of the roll paper by a few millimeters. Subsequently, the printer driver section 520 allows the printer 10 to carry out printing so that the portions on both side regions wider than the width of the roll paper respectively protrude from the right and left sides of the roll paper, thereby achieving the continuous borderless printing on the roll paper.

In some cases, when the printer driver section 520 carries out the continuous borderless printing, it divides the continuous image into some areas (hereinafter, referred to as a "page"), without processing the entire continuous image at a time, considering a capacity of RAM 52 and the like. Then the printer driver section 520 generates print data by page, and transmits the print data to the printer 10.

The CPU 51 executes a printer driver program, which has been loaded on the RAM 52, thereby establishing the printer driver section 520 on the computer 50.

The borderless print application program or the printer driver program may be distributed by recording the program on a portable recording medium such as CD-ROM, for example. A media reading device 63 reads out the program on the recording medium and the program can be installed on the computer 50. Alternatively, the program can be installed on the computer 50 via a computer network such as the Internet, for example.

In FIG. 2, a communications section 110, a print control section 120 and print execution section 130 are established on the printer 10.

The communications section 110 carries out information transmitting/receiving to/from the computer 50, for example, receiving of print data, transmitting information regarding the printer main body, and the like.

The print control section 120 interprets the print data transmitted from the computer 50, and performs a control to execute printing on the printer 10 according to the print data. The CPU 12 performs a processing according to the program having been loaded on the RAM 13 and the print data, thereby establishing the print control section 120 on the printer 10.

The print execution section 130 executes printing according to a direction from the print control section 120. The print mechanism 15 and the paper feed/eject mechanism 16 carry out processing respectively, thereby establishing the print execution section 130 on the printer 10.

Next, a processing of the borderless print program section 510 will be explained.

The borderless print program section 510 carries out a processing for generating image data to be printed, and a processing for printing the image data thus generated.

In other words, it is possible for a user to generate and/or edit the image data to be printed in the print area, by use of the image processing section 511 in the borderless print program section 510.

Prior to generating and editing the image data, the user instructs the control section 512 of the borderless print program section 510 what kind of printing is to be carried out by generating the image. The control section 512 offers the user a choice of menu type options and receives the instruction from the user.

In the present embodiment, it is assumed that the user instructs a continuous borderless printing onto roll paper having a width of 89 mm.

The control section 512 notifies the printer driver section 520 of this information regarding this instruction, and obtains a print area from the printer driver section 520. In this case, for example, it is assumed that protruding areas of 3 mm respectively for the left and right sides are provided, so as to carry out borderless printing, and the printer driver section 520 informs that the print area has a width of 95 mm.

The image processing section 511 sets a print area of the image data to be printed according to the width thus obtained. In other words, the area having the width of 95 mm including the protruding areas is set as the print area. It is to be noted here that the dimension in the vertical direction depends on the image that the user tries to generate. Since this dimension has nothing to do with the both side margins of the roll paper, it is not discussed here.

The image processing section 511 displays an area corresponding to the width of the roll paper, designating it as the edit display for generating an image, without displaying the protruding areas on the both sides with respect to the actual print area being set up. Subsequently, the user can generate and/or edit the image to be printed in the area thus displayed.

In some cases such that a photo image is read according to a user's instruction, or an image is designated as a background image by the user, a horizontal to vertical ratio of the current area with margins is calculated so that the image can be captured as image data of actual area including the protruding areas, unlike the area displayed on the edit display. Then, the image data is captured after trimming is performed at the ratio thus calculated. It is to be noted here that even after the image data is captured, it is possible to enlarge or reduce the data at a ratio arbitrarily instructed by the user.

It is further possible for the user to process the image and to add characters and/or graphics and the like to the image on the edit display which is being displayed, in a similar manner as conventional image creation and/or editing processing. At this stage, it is not necessary for the user to be aware that an image having a region narrower on both sides than the actual image is displayed on the edit display.

When the control section 512 of the borderless print program section 510 receives a print execution command from the user, it outputs the image data as an edit target to the printer driver section 520, and requests the continuous borderless printing. The image data thus outputted is data corresponding to the actual print area including the protruding areas.

The printer driver section 520 which has inputted the image data from the borderless print program section 510 generates print data by page on the basis of the image data, and outputs the print data to the printer 10.

Subsequently, the printer 10 prints the print data by page continuously on the roll paper, thereby achieving a print result of continuous both-sides borderless printing as shown in FIG. 3B, having the same region as the image region being displayed on the screen.

What is claimed is:

1. A print system which carries out a continuous borderless printing by printing an image having a wider width than a width of continuous-form paper, comprising,
    a print area setting means which sets a print area having a wider width than the width of the continuous-form paper,
    an image display means which displays only an area corresponding to the width of the continuous-form paper out of said print area having been set by said print area setting means,
    an image read means which reads an image as to the print area having been set by said print area setting means,
    an image edit means which edits the image as to the area being displayed,
    a print data generation means which generates print data on the basis of the image as to the print area having been set by said print area setting means, and
    a print execution means which executes printing on the basis of the print data.

2. A print system according to claim 1, wherein,
    said print data generation means generates the print data so that a center of the print area having been set by said print area setting means, agrees with a center of the continuous-form paper.

3. A printer host which generates print data which allows a printer having a function of printing on continuous-form paper, to execute a continuous borderless printing, comprising,
    a print area setting means which sets a print area having a wider width than a width of the continuous-form paper,
    an image display means which displays only an area corresponding to the width of the continuous-form paper out of the print area having been set by said print area setting means,
    an image read means which reads an image as to the print area having been set by said print area setting means,
    an image edit means which edits the image as to the area being displayed, and
    a print data generation means which generates print data on the basis of the image as to the print area having been set by said print area setting means.

4. A computer-readable medium having a print support program stored thereon, the print support program being configured to be executed by a computer having a print data generation means which generates print data for allowing a printer having a function of printing on continuous-form paper, to execute a continuous borderless printing, said program causing the computer to execute,
    a print area setting processing which sets a print area having a wider width than the width of the continuous-form paper,
    an image display processing which displays only an area corresponding to the width of the continuous-form paper out of said print area having been set by said print area setting processing,
    an image read processing which reads an image as to the print area having been set by said print area setting processing, according to an instruction from a user,
    an image edit processing which edits the image as to the area being displayed, according to an instruction from the user, and
    an image data output processing which outputs to said print data generation means the image data corresponding to the print area having been set by said print area setting processing.

5. A computer-readable medium according to claim 4, wherein,
    said print area setting processing sets a print area according to a notification from a printer driver provided in said computer.

6. A print method which carries out a continuous borderless printing by printing an image having a wider width than a width of continuous-form paper, comprising,
    a print area setting step which sets a print area having a wider width than the width of the continuous-form paper,
    an image display step which displays only an area corresponding to the width of the continuous-form paper out of said print area having been set by said print area setting step,
    an image read step which reads an image as to the print area having been set by said print area setting step, according to an instruction from a user, an image edit step which edits the image as to the area being displayed, according to an instruction from a user, a print data generation step which generates print data on the basis of the image as to the print area having been set by said print area setting step, and a print execution step which executes printing on the basis of the print data.

* * * * *